(12) United States Patent
Nash

(10) Patent No.: US 8,762,055 B2
(45) Date of Patent: Jun. 24, 2014

(54) NAVIGATION SYSTEM WITH DEVICE ORIENTATION MECHANISM AND METHOD OF OPERATION THEREOF

(75) Inventor: Christopher Raymond Nash, Hollister, CA (US)

(73) Assignee: Telenav, Inc., Sunnyvale, CA (US)

( * ) Notice: Subject to any disclaimer, the term of this patent is extended or adjusted under 35 U.S.C. 154(b) by 0 days.

(21) Appl. No.: 13/562,202

(22) Filed: Jul. 30, 2012

(65) Prior Publication Data

US 2013/0060467 A1 Mar. 7, 2013

Related U.S. Application Data

(60) Provisional application No. 61/532,013, filed on Sep. 7, 2011.

(51) Int. Cl.
*G01P 15/00* (2006.01)

(52) U.S. Cl.
USPC .......................................... 701/500; 702/141

(58) Field of Classification Search
USPC .......................................... 701/500; 702/141
See application file for complete search history.

(56) References Cited

U.S. PATENT DOCUMENTS

| 7,966,146 B2 | 6/2011 | Shkolnikov |
| 7,970,573 B2 | 6/2011 | Shah et al. |
| 2005/0021270 A1 * | 1/2005 | Hong et al. ..................... 702/96 |
| 2008/0255722 A1 | 10/2008 | McClellan et al. |
| 2010/0161271 A1 * | 6/2010 | Shah et al. ..................... 702/141 |

OTHER PUBLICATIONS

Chalko, "Combining Accelerations and GPS-Doppler Velocities", Apr. 27, 2010, pp. 5, Publisher: Scientific Engineering Research P/L, Published in: Mt Best, Victoria, Australia.
Gazali, "Monitoring Erratic Driving Behavior Caused by Vehicle Overtaking Using Off-the-shelf Technologies", Oct. 2010, pp. 71, Publisher: University of Dublin.

* cited by examiner

*Primary Examiner* — Mary Cheung
*Assistant Examiner* — Yuen Wong
(74) *Attorney, Agent, or Firm* — IP Investment Law Group

(57) ABSTRACT

A method of operation of a navigation system includes: receiving acceleration information, including an acceleration measurement, and location information; calculating a total acceleration magnitude, having a vertical acceleration magnitude and a horizontal acceleration magnitude, from the acceleration measurement; calculating an average velocity estimation from the location information; calculating an average acceleration estimation from the location information; calculating a component angle between the average velocity estimation and the average acceleration estimation; calculating a forward acceleration and a lateral acceleration with the component angle and the horizontal acceleration magnitude; and generating a motion classification for a travel acceleration based on the forward acceleration and the lateral acceleration for displaying on a device.

20 Claims, 7 Drawing Sheets

NAVIGATION SYSTEM WITH DEVICE ORIENTATION MECHANISM AND METHOD OF OPERATION THEREOF

CROSS-REFERENCE TO RELATED APPLICATION(S)

This application claims the benefit of U.S. Provisional Patent Application Ser. No. 61/532,013 filed Sep. 7, 20011, and the subject matter thereof is incorporated herein by reference thereto.

TECHNICAL FIELD

The present invention relates generally to a navigation system, and more particularly to a system for location.

BACKGROUND ART

Modern portable consumer and industrial electronics, especially client devices such as navigation systems, cellular phones, smart phones, portable digital assistants, and combination devices, are providing increasing levels of functionality to support modern life including location-based information services. Numerous technologies have been developed to utilize this new functionality. Some of the research and development strategies focus on new technologies while others focus on improving the existing and mature technologies. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

Thus, a need still remains for a navigation system for device orientation. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving acceleration information, including an acceleration measurement, and location information; calculating a total acceleration magnitude, having a vertical acceleration magnitude and a horizontal acceleration magnitude, from the acceleration measurement; calculating an average velocity estimation from the location information; calculating an average acceleration estimation from the location information; calculating a component angle between the average velocity estimation and the average acceleration estimation; calculating a forward acceleration and a lateral acceleration with the component angle and the horizontal acceleration magnitude; and generating a motion classification for a travel acceleration based on the forward acceleration and the lateral acceleration for displaying on a device.

The present invention provides a navigation system, including: a collection module for receiving acceleration information, including an acceleration measurement, and location information; a rotation independence module, coupled to the collection module, for calculating a total acceleration magnitude, having a vertical acceleration magnitude and a horizontal acceleration magnitude, from the acceleration measurement; a velocity average module, coupled to the rotation independence module, for calculating an average velocity estimation from the location information; an acceleration average module, coupled to the velocity average module, for calculating an average acceleration estimation from the location information; an angle calculation module, coupled to the acceleration average module, for calculating a component angle between the average velocity estimation and the average acceleration estimation; a forward acceleration module, coupled to the angle calculation module, for calculating a forward acceleration with the component angle and the horizontal acceleration magnitude; a lateral acceleration module, coupled to the angle calculation module, for calculating a lateral acceleration with the component angle and the horizontal acceleration magnitude; and an acceleration analysis module, coupled to the rotation independence module, for generating a motion classification for a travel acceleration based on the forward acceleration and the lateral acceleration for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
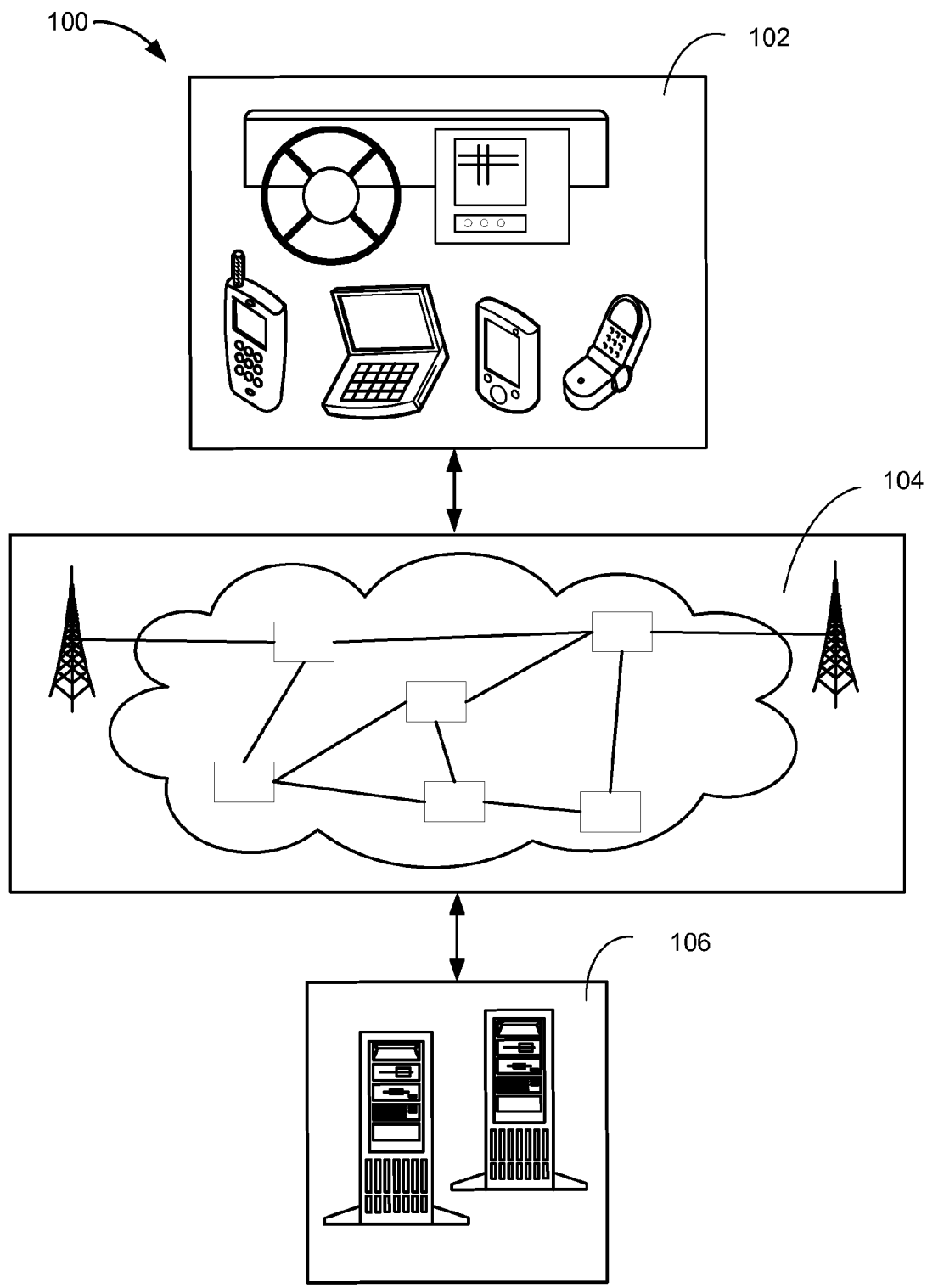
FIG. 1 is a navigation system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y, Z), where X, Y and Z are three ordinates that define the geographic location, i.e., a position of a user.

The navigation information can be presented by longitude and latitude related information. The navigation information can also include a velocity element comprising a speed component and a direction component.

The term "navigation routing information" referred to herein is defined as the routing information as well as information relating to points of interest, such as local business, hours of businesses, types of businesses, advertised specials, traffic information, maps, local events, and nearby community or personal information.

The term "module" referred to herein includes software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, or a combination thereof.

Many of the client devices currently in use today feature an accelerometer, allowing accurate measurement of acceleration in the three axes of the device. Such devices could be used to gather acceleration and braking data from a vehicle, provided that the device was mounted in a known fixed position. Such mounting and orientation is not an issue for devices that are integrated with the vehicle. However, this may not be the case where the device for which the measurements are to be collected is not integrated with or mounted within the vehicle.

Driver metrics can be returned from an accelerometer device mounted rigidly in a vehicle are typically inconvenient for consumers, for example, requiring hardware and data plans. The problem comes to transform phone accelerometer readings into vehicle coordinates, since the phone orientation in the vehicle is not necessarily known.

Collecting sufficient information for acceleration from the device would enable a correct orientation determination. For example, the vertical down axis may be identified, since there will always show an acceleration component due to gravity. However, rotation about that vertical axis is not so easily resolved, and this is of primary concern, since the direction of the acceleration in the horizontal plane can distinguish between driver behavior, such as acceleration, braking, and turning.

Referring now to FIG. 1, therein is shown a navigation system 100 in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
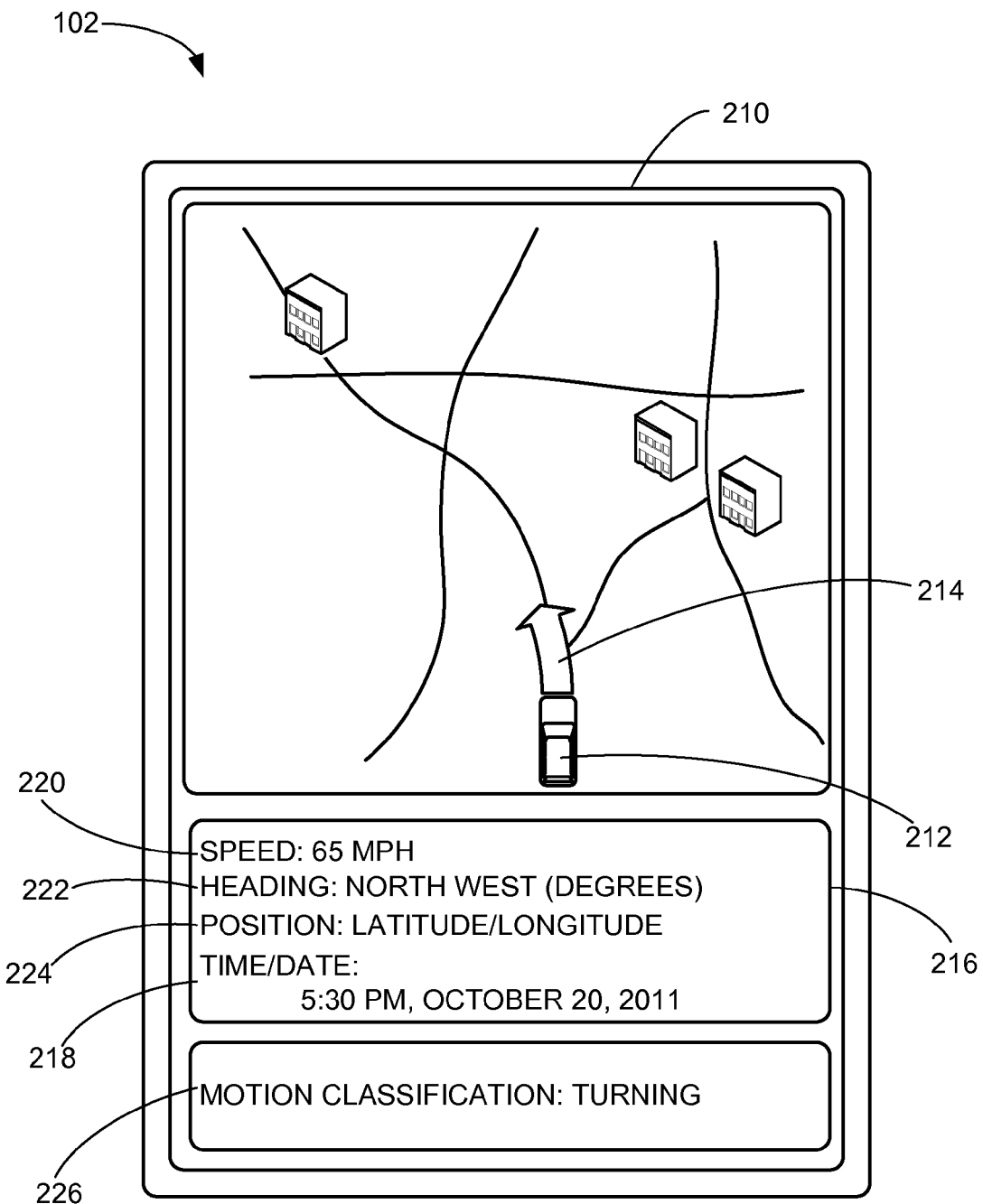
FIG. 2 is an example of a display interface of the first device.

Referring now to FIG. 2, therein is shown an example of a display interface 210 of the first device 102. The display interface 210 can display a representation of a user vehicle 212 traveling along a travel route 214. The user vehicle 212 can be any vehicle that a user of the navigation system 100 is using for travel. For example, the user vehicle 212 can be a bicycle, motorcycle, an automobile, a truck, a bus, or a motorhome. The travel route 214 is defined as a path that the user vehicle 212 is traveling on to reach a destination.

The display interface 210 can display location information 216 of the user vehicle 212, the first device 102 or a combination thereof. The location information 216 is defined as information related to the location, direction of travel, and speed of travel at a particular instant in time. The location information 216 can include a location timestamp 218, a travel speed 220, a travel heading 222, and a travel position 224.

The location timestamp 218 is defined as the instant or moment in time that information related to location and motion is measured or observed. The location timestamp 218 can be the date and time for the instant that the location information 216 for the first device 102, the user vehicle 212, or a combination thereof is observed or measured. For example, the location timestamp 218 can be 5:30 pm and 1.00 seconds on Oct. 20, 2011 when the location information 216 of the user vehicle 212, the first device 102, or a combination thereof is measured.

The travel speed 220 is defined as the measurement, observation, or calculation of speed at a particular instant in time. For example, the travel speed 220 can be the speed of the user vehicle 212, the first device 102, or a combination thereof at a particular instant in time. As a further example, the display interface 210 can display the travel speed 220 as 65 miles per hour (MPH). Optionally, the display interface 210 can display the vehicle speed in any other unit measurement of speed, such as kilometers per hour, meters per second, or feet per minute.

The travel heading 222 is defined as the direction of travel at a particular instant in time. For example, the travel heading 222 can be the direction of travel of the user vehicle 212, the first device 102, or a combination thereof at a particular instant in time. As a further example, the travel heading 222 can be expressed in cardinal direction, such as north, east, south, or west. In another example, the travel heading 222 can be expressed as an angle relative to a fixed a fixed position, such as north.

The travel position 224 is defined as the geographic location at a particular point in time. For example, the travel position 224 can be the position or location of the user vehicle 212, the first device 102, or a combination thereof. As a further example, the travel position 224 can be described by longitude and latitude coordinates, such as a latitude of 37 Deg., 22 Min., 26.07 Sec. and a longitude of −121 Deg., 59 Min., and 56.94 Sec.

The display interface 210 can display a motion classification 226. The motion classification 226 is defined as a classification of specific types of motion. For example, the motion classification 226 can represent various types of motion, such as motion of the user vehicle 212, the first device 102, or a combination thereof, such as braking hard braking increasing speed, turning, or hard turning. The motion classification 226 be announced with sound by the first device 102 or optionally may not be displayed on the first device 102.

Figure 3:
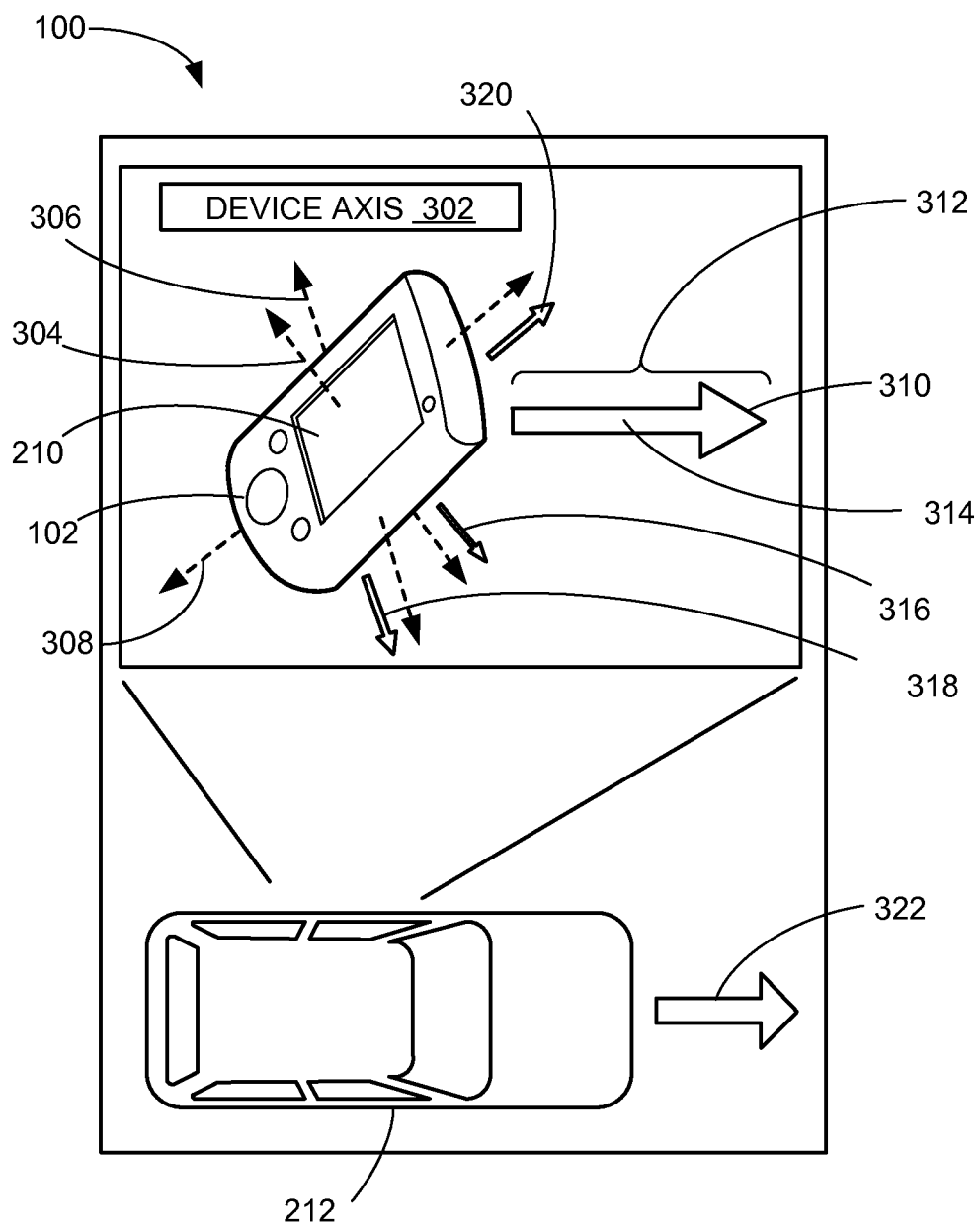
FIG. 3 is an example of a portion of the navigation system.

Referring now to FIG. 3, therein is shown an example of a portion of the navigation system 100. The navigation system 100 depicts the first device 102, having a device axis 302, in the user vehicle 212. The first device 102 can be in an unknown orientation within the user vehicle 212. For example, the first device 102 can be placed upside down or tilted at an angle in a compartment of the user vehicle 212 or in a bag located within the user vehicle 212.

The device axis 302 is defined as a set of three dimensional axis. The device axis 302 can be used to describe orientation, motion, vectors, and forces relative to the first device 102. The device axis 302 can include a device x-axis 304, a device y-axis 306, and a device z-axis 308.

As an example, the device axis 302 can correspond to the surfaces of the first device 102 or to a component within the first device 102, such as an accelerometer. As a specific example, the axis perpendicular to the front and back of the first device 102 can be the device x-axis 304. For illustrative purposes, the front of the first device 102 can be the side of the first device 102 having the display interface 210.

In another example, the axis perpendicular to the lateral sides of the first device 102 can be the device y-axis 306. In a further example, the axis perpendicular to the top and bottom side of the first device 102 can be the device z-axis 308. The top of the first device 102 can be the side of the first device 102 that is above the side having the display interface 210 when the first device 102 is in an upright position.

The device axis 302 can be used to express an acceleration measurement 310. The acceleration measurement 310 can be a measurement of acceleration at an instant in time. The acceleration measurement 310 can include an acceleration measurement magnitude 312 and an acceleration measurement direction 314.

The acceleration measurement magnitude 312 and the acceleration measurement direction 314 can be express with the device x-axis 304, the device y-axis 306, and the device z-axis 308. For example, the acceleration measurement magnitude 312 can have components along each of the device axis 302. As a specific example, the component of the acceleration measurement magnitude 312 along the device x-axis 304 can be an x-component magnitude 316, the component of the acceleration measurement magnitude 312 along the device y-axis 306 can be a y-component magnitude 318, and the component of the acceleration measurement magnitude 312 along the device y-axis 306 can be a z-component magnitude 320.

The direction of the acceleration measurement direction 314 in terms of real world motion, such as the travel heading 222 of FIG. 2 or motion of the user vehicle 212, can be unknown or unaligned relative to the device axis 302. For example, if the first device 102 is oriented upside-down in the user vehicle 212 of FIG. 2, acceleration along the travel heading 222 would be measured as reverse motion relative to the front of the first device 102.

A portion of the acceleration measurement 310 can include a travel acceleration 322. The travel acceleration 322 is defined as measurements of acceleration while traveling along a route. For example, the travel acceleration 322 can be the acceleration of the user vehicle 212 while traveling along the travel route 214 of FIG. 2, such increasing speed, turning, or braking.

Figure 4:
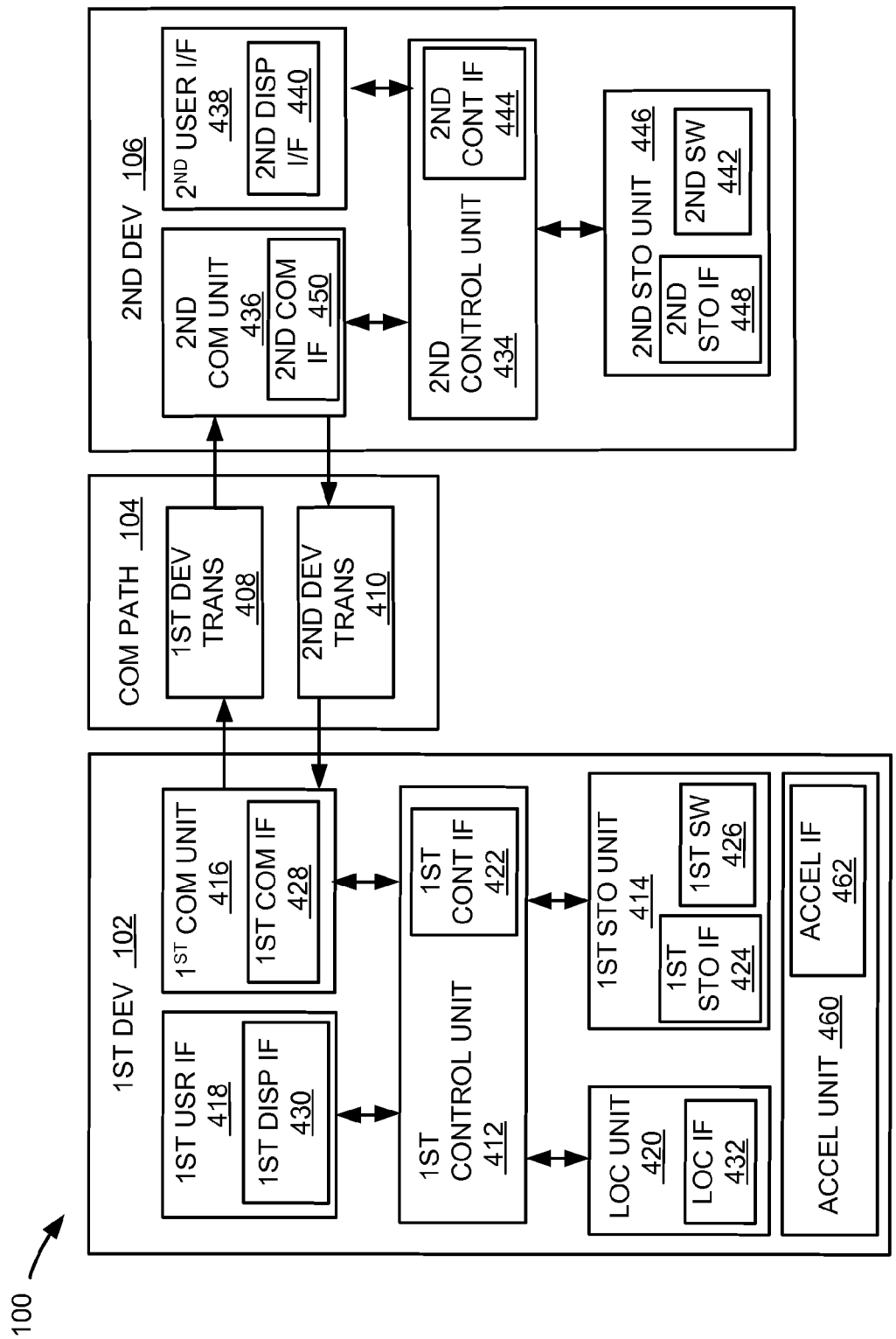
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100.

The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as nonvolatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The first device 102 can include an accelerometer unit 460. The accelerometer unit 460 is for detecting acceleration of or other forces that act upon the first device 102. The accelerometer unit 460 can include hardware to detect acceleration or other forces, such as a micro electro-mechanical system, a piezoelectric or piezoresitive device.

The accelerometer unit 460 can include an accelerometer interface 462 that can communicate information to the other units, such as the first storage unit 414. The first control unit 412 can operate the accelerometer unit 460.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
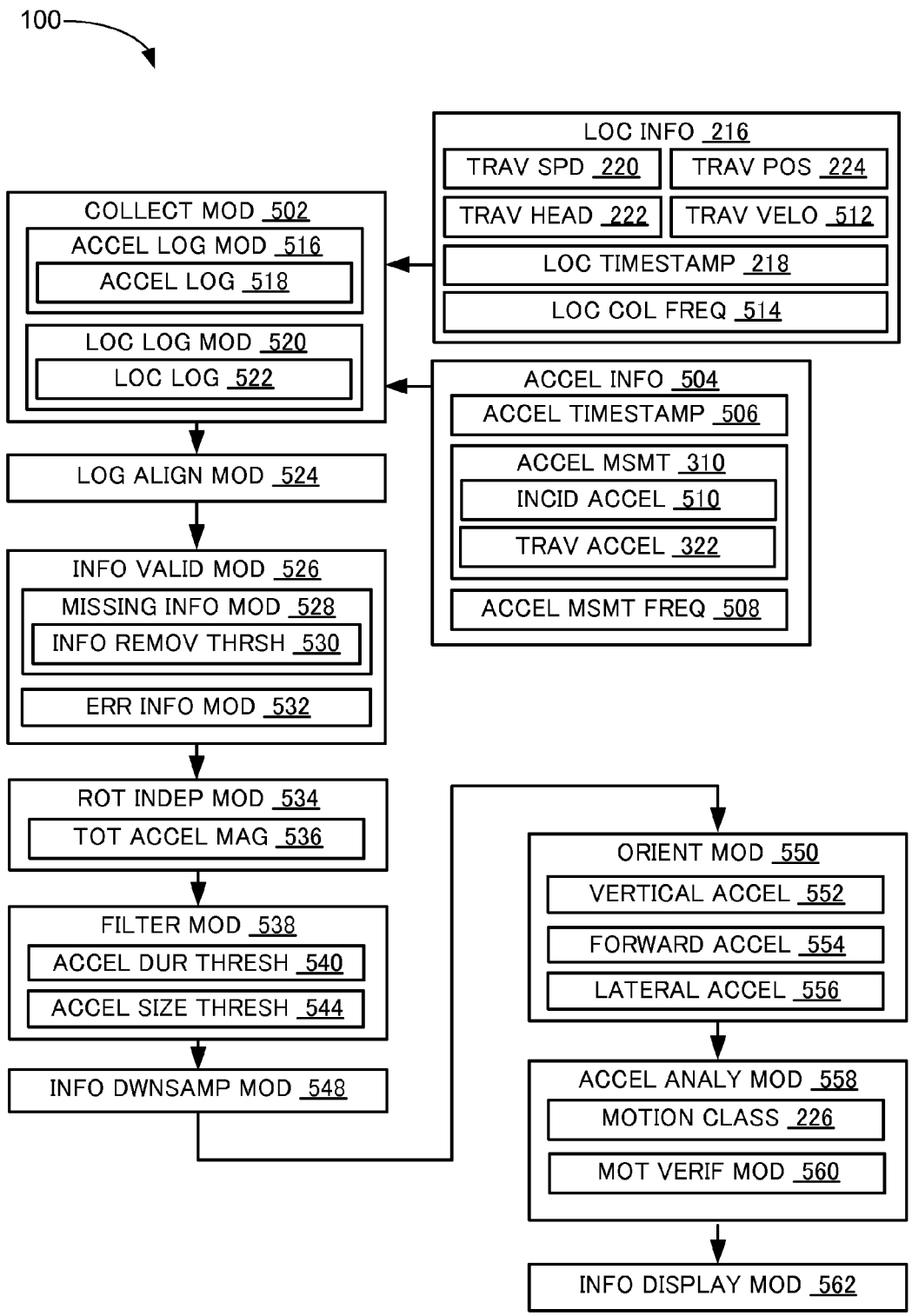
FIG. 5 is a control flow of the navigation system.

Referring now to FIG. 5, therein is shown a control flow of the navigation system 100. The navigation system 100 can include a collection module 502. The collection module 502 is for collecting information related to the location, speed, motion, direction, acceleration or a combination thereof for a device, vehicle, user, or a combination thereof. The collection module 502 can receive acceleration information 504 and the location information 216.

The acceleration information 504 is defined as a measurement of acceleration at an instant in time. The acceleration information 504 can be the measurement of acceleration of the first device 102 of FIG. 1, the user vehicle 212 of FIG. 2, or a combination thereof. For example, the acceleration information 504 can be the acceleration measured by the first device 102 while in the user vehicle 212.

As a further example, the acceleration information 504 can be a measurement of the acceleration of the user vehicle 212, such as acceleration due to increasing speed, braking or turning. As another example, the acceleration information 504 can be a measurement of acceleration due to motion of the first device 102 while in the user vehicle 212, such as shifting of position or orientation in a bag, tipping over in a cup holder, or sliding on the seat or other surface in the user vehicle 212.

The acceleration information 504 can include an acceleration timestamp 506 and the acceleration measurement 310. The acceleration timestamp 506 is defined as the instant in time when acceleration is measured. For example, the acceleration timestamp 506 can be instant or moment in time when the acceleration measurement 310 of the acceleration information 504 was measured.

The acceleration information 504 can be measured based on an acceleration measurement frequency 508. The acceleration measurement frequency 508 is defined as the frequency at which information related to acceleration is measured. The acceleration measurement frequency 508 can be the frequency or the number of times the acceleration measurement 310 of the acceleration information 504 is measured over a period of time. For example, the acceleration measurement frequency 508 can be measured per seconds, such as Hz. As a specific example, the acceleration measurement frequency 508 can be a frequency of 5 Hz, although it is understood that the acceleration measurement frequency 508 can have a higher or lower frequency.

The acceleration measurement 310 can be the measurement of acceleration for the first device 102, the user vehicle 212, or a combination thereof at a specific point in time, as denoted by the acceleration timestamp 506. The acceleration measurement 310 can represent and include the travel acceleration 322 of FIG. 3, an incidental acceleration 510, or a combination thereof.

The incidental acceleration 510 is defined as measurements of acceleration incidental to the motion of a vehicle or device. For example, the incidental acceleration 510 can be due to travel of the user vehicle 212 along the driving surface, such as gravel or unpaved roads, bumps, or potholes. As a further example, the incidental acceleration 510 due to motion of the first device 102 while in the user vehicle 212, such as shifting of position or orientation in a bag, tipping over in a cup holder, or sliding on the seat or other surface in the user vehicle 212.

As an example, the collection module 502 can receive the acceleration information 504 from the accelerometer unit 460 FIG. 4 of the first device 102. As a further example, the accelerometer unit 460 can obtain the acceleration measurement 310 of the acceleration information 504 at the acceleration measurement frequency 508.

The location information 216 can include the travel speed 220, the travel heading 222, a travel velocity 512 and the travel position 224 at a specific point in time, as denoted by the location timestamp 218. The travel velocity 512 is a velocity vector with the magnitude as the travel speed 220 and the direction as the travel heading 222. The location information 216 can be obtained at a location collection frequency 514.

The location collection frequency 514 is defined as the frequency at which information related to location is obtained. The location collection frequency 514 can be the frequency or the number of times the location information 216 is obtained over a period of time. For example, the location collection frequency 514 can be measured as a frequency, such as Hz. As a specific example, the location collection frequency 514 can be a frequency of 1 Hz, although it is understood that the location collection frequency 514 can have a higher or lower frequency.

The collection module 502 can include an acceleration log module 516 and a location log module 520. The acceleration log module 516 is for generating a series of entries containing information related to acceleration. The acceleration log module 516 can generate an acceleration log 518 with at least one of the acceleration information 504.

The acceleration log module 516 can generate the acceleration log 518 based on the acceleration timestamp 506 of the acceleration information 504. For example, the acceleration log module 516 can generate the acceleration log 518 based on the chronological order of the acceleration timestamp 506 for each of the acceleration information 504. Each one of the acceleration information 504 in the acceleration log 518 is unique based on the acceleration timestamp 506.

The location log module 520 is for generating a series of entries containing information related to location. The location log module 520 can generate a location log 522 with at least one of the location information 216.

The acceleration log module 516 can generate the acceleration log 518 based on the acceleration timestamp 506 of the acceleration information 504. For example, the acceleration log module 516 can generate the acceleration log 518 based on the chronological order of the acceleration timestamp 506 for each of the acceleration information 504. Each one of the location information 216 in the location log 522 is unique based on the location timestamp 218.

The navigation system 100 can have a log alignment module 524 coupled to the collection module 502. The log alignment module 524 is for aligning or matching information between information logs or information sets. The log alignment module 524 can align each entry of the location information 216 in the location log 522 with corresponding entries of the acceleration information 504 in the acceleration log 518. For example, the log alignment module 524 can temporally adjust the entries of the location log 522, the acceleration log 518, or a combination thereof based on the location timestamp 218 and the acceleration timestamp 506 to, for example, correct for any clock skew or to synchronize the entries of the location log 522, the acceleration log 518, or a combination thereof.

As a further example, the log alignment module 524 can align or synchronize the entries of the location log 522, the acceleration log 518 based on calibration. As a specific example, the log alignment module 524 can calibrate the acceleration timestamp 506 and the location timestamp 218 when the location information 214 indicates that the first device 102, the user vehicle 212, or a combination thereof are not changing position.

To continue the example, if a series of entries in the location log 522 includes the location information 214 indicating no change in the travel position 224, the navigation system 100 can determine that the user vehicle 212, or a combination thereof is stationary. The log alignment module 524 can then shift entries in the acceleration log 518 that also indicate no movement forward or backwards in time to correspond with the entries in the location log 522 corresponding to no motion.

The log alignment module 524 can calibrate the location log 522 and the acceleration log 518 at predetermined periods or intervals, such as at the beginning or end of a trip or navigation session. As a further example, the log alignment module 524 can calibrate the location log 522 and the acceleration log 518 periodically, such as when the location information 216 or the acceleration information 506 indicate periods of no motion.

In yet a further example, the entries of the location log 522 and the acceleration log 518 can be synchronized based on a shared clock in the collection module 502. The shared clock can enable the collection module 502 to receive, retrieve, or generate corresponding pairs of entries for the location log 522 and the acceleration log 518.

The navigation system 100 can include an information validation module 526 coupled to the log alignment module 524. The information validation module 526 is for removing or ignoring erroneous, invalid, or inaccurate information and adjusting for missing information. The information validation module 526 can enable the navigation system 100 to remove or ignore entries of the acceleration information 504 in the acceleration log 518 or the location information 216 in the location log 522 that are erroneous or inaccurate and can, for example, cause errors in later calculations and processing.

The information validation module 526 can include a missing information module 528. The missing information module 528 is for adjusting information logs to accommodate for missing information. The missing information module 528 can remove entries of the acceleration log 518 or the location log 522 when an insufficient number of the acceleration information 504 or the location information 216 exists. The information validation module 526 can determine whether the number of the acceleration information 504 or the location information 216 is insufficient based on an information removal threshold 530.

For example, when the number of entries in the acceleration log 518 is below the information removal threshold 530, which can be due to missing or unavailable entries of the acceleration information 504, the information validation module 526 can remove the location information 216 in the location log 522. As a specific example, the information validation module 526 can remove the location information 216 corresponding to gaps in the acceleration log 518 that should include the entry of the acceleration information 504.

Similarly, for example, when the number of entries in the location log 522 is below the information removal threshold 530, the information validation module 526 can remove the acceleration information 504 in the acceleration log 518. As a specific example, the information validation module 526 can remove the acceleration information 504 in the acceleration log 518 corresponding to gaps in the location log 522 that should include the entry of the location information 216. As a further example, the information removal threshold 530 can be different for removal of the acceleration information 504 and the location information 216.

The information removal threshold 530 can be set or determined by a number of methods. For example, information removal threshold 530 can be experimentally or heuristically determined. As another example, the information removal threshold 530 can be determined based on a percentage of the total number of entries in the location log 522 or the acceleration log 518. As a specific example, the information removal threshold 530 can be 30% of the total number of entries or subset of entries in the location log 522 or the acceleration log 518. To illustrate the specific example, when 30% of a given number or subset of entries of the location log 522 or the acceleration log 518 are missing, the information validation module 526 can remove the corresponding entries of the location log 522 or the acceleration log 518.

As specific examples, the information validation module 526 can determine whether the number of the acceleration information 504 or the location information 216 is insufficient in specific situations or circumstances. The specific situations or circumstances can include when the navigation system 100 begins operation of the location unit 420 of FIG. 4 and can generate inaccurate instances of the location information while determining the travel position 224 of the first device 102, the user vehicle 212, or a combination thereof.

The information validation module 526 can include an erroneous information module 532, coupled to the information validation module 526. The erroneous information module 532 is for removing or ignoring erroneous, invalid, or inaccurate information. The erroneous information module 532 can remove the location information 216 from the location log 522 and the acceleration information 504 from the acceleration log 518 that are erroneous, invalid, or inaccurate. The erroneous, invalid, or inaccurate can be, for example, For example, the erroneous information module 532 can detect invalid, or inaccurate can be, for example, such as a "GPS jump." The GPS jump can occur when one of the location information 216 in a series of entries of the location log 522 indicates a large or improbable change in the travel position 224 of FIG. 2 relative to the travel position 224 for consecutive entries in the location log 522. Large or improbable changes in the travel position 224 for one or more consecutive entries in the location log 522, for example, can correspond to traveling a large distance, such as 50 miles, in short period of time, such as one second, while traveling in an automobile. Further, large or improbable changes can be exemplified by a series of entries in the location log 522 indicating travel along a road with one entry indicating travel along a different road or in a different location.

The erroneous information module 532 can also remove corresponding entries in the location log 522 or the acceleration log 518. In the example above, in the case of a "GPS jump," the erroneous information module 532 can remove the location information 216 from the location log 522 and the corresponding entry of the acceleration information 504 from the acceleration log 518.

It has been discovered that the removing inaccurate, erroneous, or invalid entries of the acceleration log 518, the location log 522, or a combination thereof with the missing information module 528 and the erroneous information module 532 provides accurate determination of the location information 216 and the acceleration information 504.

The navigation system 100 can include a rotation independence module 534, coupled to the information validation module 526. The rotation independence module 534 is for removing the orientation or directional components of acceleration vectors. The rotation independence module 534 can remove the directional component of the acceleration measurement 310 for one or more entries of the acceleration information 504 in the acceleration log 518.

For example, the rotation independence module 534 can make the acceleration measurement 310 independent of the orientation of the first device 102 by calculating a total acceleration magnitude 536. The total acceleration magnitude 536 is defined as the total magnitude of acceleration calculated based on the magnitude of the three dimensional vector components of acceleration. The total acceleration magnitude 536 can be included as part of the acceleration information 504 for a given entry in the acceleration log 518.

The rotation independence module 534 can calculate the total acceleration magnitude 536 based on the x-component magnitude 316 of FIG. 3, the y-component magnitude 318 of FIG. 3, and the z-component magnitude 320 of the acceleration measurement 310. As an example, the rotation independence module 534 can calculate the total acceleration magnitude 536 according to equation 1 as follows:

$$m_t = (m_{ax}^2 + m_{ay}^2 + m_{az}^2)^{1/2} \quad \text{(Equation 1)}$$

The total acceleration magnitude 536 can be represented by the variable "$m_t$". The x-component magnitude 316 can be represented by the variable "$m_{ax}$". The y-component magnitude 318 can be represented by the variable "$m_{ay}$". The z-component magnitude 320 can be represented by the variable "$m_{az}$".

The navigation system 100 can include a filter module 538, coupled to the collection module 502. The filter module 538 is for removing the portion of a measurement of acceleration representing acceleration incidental to vehicle motion. The filter module 538 can remove the portion of the acceleration measurement 310 representing the incidental acceleration 510 based on an acceleration duration threshold 540 and an acceleration size threshold 544.

The acceleration duration threshold 540 is defined as a temporal threshold for determining whether a series of measured accelerations is due to continuous motion over a period of time. For example, the acceleration duration threshold 540 can be based on expected durations for vehicle acceleration. As a specific example, the acceleration duration threshold 540 can be two seconds since the duration for acceleration due to vehicle motion generally spans two or more seconds.

In another example, the acceleration duration threshold 540 can be based on a range. The range can be determined based on a predetermined or expected duration of acceleration due to vehicle motion, such as a period or range of time between two and five seconds. As a specific example, the filter module can remove a series of entries from the acceleration log 518 having the acceleration measurement 310 spanning less than two seconds or greater than five seconds.

The acceleration size threshold 544 is defined as a threshold to determine whether the magnitude of the acceleration measurement 310 is sufficient to represent acceleration due to motion of a vehicle. As an example, the acceleration size threshold 544 can be determined experimentally or heuristically. As a further example, the acceleration size threshold 544 can be a predetermined value, such as a value greater than the magnitude of the acceleration due to gravity. In yet a further example, the acceleration size threshold 544 can be correlated to the magnitude of acceleration when accelerating or decelerating at a specific rate, such as 24 miles per hour to zero miles per hour over a three second time interval.

The filter module 538 can compare the total acceleration magnitude 536 for a series of entries of the acceleration measurement 310 in the acceleration log 518 to the acceleration duration threshold 540 and the acceleration size threshold 544 to determine whether the acceleration measurement 310 represents the incidental acceleration 510 or the travel acceleration 322. For example, the filter module 538 can determine the acceleration measurement 310 for a series of entries in the acceleration log 518 as the travel acceleration 322 when each of the total acceleration magnitude 536 for the entries is greater than the acceleration size threshold 544 and the number of entries span a time period greater than the acceleration duration threshold 540. As an example, the span of time for the series of entries in the acceleration log 518 can be determined by the time elapsed between the acceleration timestamp 506 for each of the entries.

Conversely, for example, the filter module 538 can determine that the acceleration measurement 310 for a series of entries in the acceleration log 518 represents the incidental acceleration 510 when each of the entries is greater than the acceleration size threshold 544 and the number of entries span a time period less than the acceleration duration threshold 540. The filter module 538 can remove the acceleration information 504 representative of the incidental acceleration 510 or can be retained for reprocessing such as reprocessing after adjustment of the acceleration duration threshold 540, the acceleration size threshold 544, or a combination thereof.

It has been discovered that the filter module 538 provides the acceleration measurement 310 in the acceleration log 518 corresponding to the travel acceleration 322 by removing the entries of the acceleration log 518 representing the incidental acceleration 510. For example, a chart or graph of the acceleration measurement 310 corresponding to the travel acceleration 322 can include pronounced peaks when the acceleration measurement 310 corresponds to the travel acceleration 322.

The navigation system 100 can include an information downsampling module 548, coupled to the filter module 538. The information downsampling module 548 is for removing information measured at a rate in excess relative to the measurement or collection rate for a corresponding set of information. The information downsampling module 548 can remove entries of the acceleration information 504 from the acceleration log 518 or entries of the location information 216 from the location log 522 based on The acceleration measurement frequency 508 and the location collection frequency 514, respectively.

For example, when The acceleration measurement frequency 508 is greater than the location collection frequency 514, the information downsampling module 548 can remove the acceleration information 504 received between one of the location information 216 and a consecutive one of the location information 216. This can be done so The acceleration measurement frequency 508 can match the location collection frequency 514. As a specific example, for the location collection frequency 514 of 1 Hz, the information downsampling module 548 can discard the acceleration information 504 received at frequency higher than half the location collection frequency 514. In other words, any information of frequency higher than 0.5 Hz or 10 received information over the same period can be removed.

The navigation system 100 can include an orientation module 550, coupled to the information downsampling module 548. The orientation module 550 is for calculating forward, lateral, and vertical components of acceleration based on information related to location and measured values of acceleration. The orientation module 550 can calculate a forward acceleration 554, a lateral acceleration 556, and a vertical acceleration 552 of the travel acceleration 322. These functions module will be discussed in detail below.

The forward acceleration 554 is defined as the component of acceleration that is parallel to the direction of travel. For example, the forward acceleration 554 can be the component of the acceleration measurement 310 representing the travel acceleration 322 that is parallel with the travel heading 222.

The lateral acceleration 556 is defined as the component of acceleration that is perpendicular to and within the same horizontal plane as the direction of travel. For example, the lateral acceleration 556 can be the component of the acceleration measurement 310 representing the travel acceleration 322 that is perpendicular to the travel heading 222.

The vertical acceleration 552 is defined as the component of the acceleration corresponding to acceleration perpendicular or normal to the horizontal plane of the direction of travel. For example, the vertical acceleration 552 can be the component of the acceleration measurement 310 perpendicular to the travel heading 222 and parallel to the direction of gravity of the earth. As a further example, the vertical acceleration 552 can be perpendicular to a horizontal plane that includes the forward acceleration 554 and the lateral acceleration 556

The vertical acceleration 552 can include acceleration due to gravity, suspension of the user vehicle 212, other vertical acceleration factors such as travel up or down inclined surfaces, or a combination thereof. The forward acceleration 554, the lateral acceleration 556, and the vertical acceleration 552 can be the three dimensional components for the travel acceleration 322.

It has been discovered that calculating the forward acceleration 554 and the lateral acceleration 556 in the horizontal plane can be used to distinguish between driver behavior, such as acceleration, braking, and turning.

The navigation system 100 can include an acceleration analysis module 558, coupled to the orientation module 550. The acceleration analysis module 558 is for correlating directional acceleration components to motion. The acceleration analysis module 558 can generate the motion classification 226 based on the forward acceleration 554 and the lateral acceleration 556.

For example, the acceleration analysis module 558 can generate the motion classification 226 as a representation of increasing speed along the travel heading 222 for positive values of the forward acceleration 554 or braking for negative values of the forward acceleration 554. In another example, the acceleration analysis module 558 can generate the motion classification 226 as a representation of turning for positive or negative values of the lateral acceleration 556.

As a further example, the acceleration analysis module 558 can generate the motion classification 226 as a representation of degrees of motion. As a specific example, the acceleration analysis module 558 can generate the motion classification 226 for large negative values of the forward acceleration 554 as a representation of hard braking. In another specific example, the acceleration analysis module 558 can generate the motion classification 226 for large values of the lateral acceleration 556 as a representation of hard turning.

The acceleration analysis module 558 can include a motion verification module 560, coupled to the acceleration analysis module 558. The motion verification module 560 is for verifying accuracy of motion analysis based on acceleration with speed, heading, and position information. The motion verification module 560 can verify the accuracy of the motion classification 226 based on with the location information 216.

For example, if a series of the location information 216 show a reduction in the travel velocity 512 and the forward acceleration 554 is negative in value, the motion verification module 560 can verify that the motion classification 226 of braking. As another example, if a series of the location information 216 shows a change in the travel heading 222 and the lateral acceleration 556 is positive or negative in value, the motion verification module 560 can verify the motion classification 226 of turning.

The navigation system 100 can include an information display module 562, coupled to the acceleration analysis module 558. The information display module 562 is for displaying notifications related to motion. For example, the information display module 562 can display the motion classification 226 on the first display interface 430 of FIG. 4 of the first device 102.

The navigation system 100 can be implemented on the first device 102 of FIG. 4, on the second device 106 of FIG. 4, or partitioned between the first device 102 and the second device 106. In an example for the first device 102 of FIG. 4, the accelerometer unit 460 of FIG. 4 can measure the acceleration measurement 310. The location unit 420 of FIG. 4 can collect the location information 216.

The first software 426 of FIG. 4 of the first device 102 can include the collection module 502, the acceleration log module 516, the location log module 520, the log alignment module 524, the information validation module 526, the missing information module 528, the erroneous information module 532, the rotation independence module 534, the filter module, the information downsampling module 548, the orientation module 550, the acceleration analysis module 558, and the acceleration analysis module 558. The first control unit 412 can execute the first software 426.

The first control unit 412 can execute the collection module 502 to collect the acceleration information 504 and the location information 216. The first control unit 412 can execute the acceleration log module 516 and the location log module 520 to generate the acceleration log 518 and the location log 522, respectively. The acceleration log 518 and the location log 522 can be stored on the first storage unit 414.

The first control unit 412 can execute the log alignment module 524, the information validation module 526, the missing information module 528, the erroneous information module 532, the filter module 538, and the information downsampling module 548 to modify the acceleration log 518, the location log 522, or a combination thereof. The first control unit 412 can execute the rotation independence module 534 to calculate the total acceleration magnitude 536. The first control unit 412 can execute the orientation module 550 to generate the vertical acceleration 552, the forward acceleration 554, and the lateral acceleration 556.

The first control unit 412 can execute the acceleration analysis module 558 to generate the motion classification 226. The first control unit 412 can execute the information display module 562 to display the motion classification 226 on the first display interface 430 of FIG. 4.

In an example for the second device 106 of FIG. 4, the second software 442 of FIG. 4 can include the navigation system 100. For example, the second software 442 can include the collection module 502, the acceleration log module 516, the location log module 520, the log alignment module 524, the information validation module 526, the missing information module 528, the erroneous information module 532, the rotation independence module 534, the filter module, the information downsampling module 548, the orientation module 550, the acceleration analysis module 558. The second control unit 434 can execute the second software 442.

The second control unit 434 can execute can execute the collection module 502 to collect the acceleration information 504 and the location information 216. The second control unit 434 can execute the acceleration log module 516 and the location log module 520 to generate the acceleration log 518 and the location log 522, respectively. The acceleration log 518 and the location log 522 can be stored on the second storage unit 446.

The second control unit 434 can execute the log alignment module 524, the information validation module 526, the missing information module 528, the erroneous information module 532, the filter module 538, and the information downsampling module 548 to modify the acceleration log 518, the location log 522, or a combination thereof. The second control unit 434 can execute the rotation independence module 534 to calculate the total acceleration magnitude 536. The first control unit 412 can execute the orientation module 550 to generate the vertical acceleration 552, the forward acceleration 554, and the lateral acceleration 556.

The second control unit 434 can execute the acceleration analysis module 558 to generate the motion classification 226. The second control unit 434 can execute the information display module 562 to display the motion classification 226 on the second display interface 440 of FIG. 4.

In another example, the navigation system 100 can be partitioned between the first software 426 and the second software 442. For example, the accelerometer unit 460 can measure the acceleration measurement 310. The location unit 420 can collect the location information 216.

The first communication unit 416 can transmit the acceleration information 504 and the location information 216 to the second device 106 through the communication path 104 of FIG. 4 with the first device transmission 408 of FIG. 4. The second device 106 can receive the acceleration information 504 and the location information 216 with the second communication unit 436 of FIG. 4.

The second software 442 can include the collection module 502, the acceleration log module 516, the location log module 520, the log alignment module 524, the information validation module 526, the missing information module 528, the erroneous information module 532, the rotation independence module 534, the filter module, the information downsampling module 548, the orientation module 550, the acceleration analysis module 558, and the acceleration analysis module 558. The second control unit 434 can execute the second software 442.

The second control unit 434 can execute can execute the collection module 502 to collect the acceleration information 504 and the location information 216. The second control unit 434 can execute the acceleration log module 516 and the location log module 520 to generate the acceleration log 518 and the location log 522, respectively. The acceleration log 518 and the location log 522 can be stored on the second storage unit 446.

The second control unit 434 can execute the log alignment module 524, the information validation module 526, the missing information module 528, the erroneous information module 532, the filter module 538, and the information downsampling module 548 to modify the acceleration log 518, the location log 522, or a combination thereof. The second control unit 434 can execute the rotation independence module 534 to calculate the total acceleration magnitude 536. The first control unit 412 can execute the orientation module 550 to generate the vertical acceleration 552, the forward acceleration 554, and the lateral acceleration 556. The second control unit 434 can execute the acceleration analysis module 558 to generate the motion classification 226.

The second device 106 can transmit the motion classification 226 through the communication path 104 with the second device transmission 410. The first device 102 can receive the motion classification 226 with the first communication unit 416. The first control unit 412 can execute the information display module 562 to display the motion classification 226 on the first display interface 430.

The navigation system 100 describes the module functions or order as an example. The modules can be partitioned differently. For example, the first control unit 412 can execute the acceleration log module 516 and the location log module 520 to generate the acceleration log 518 and the location log 522, respectively, and the second display interface 440 can display the motion classification 226. Each of the modules can operate individually and independently of the other modules.

Furthermore, data generated in one module can be used by another module without being directly coupled to each other. For example, the rotation independence module 534 can receive the acceleration log 518 from the acceleration log module 516.

The physical transformation from the navigation system 100 generating the motion classification 226, based on the forward acceleration 554 and the lateral acceleration 556, and displaying the motion classification on the first device 102 results in movement in the physical world, such as users modifying driving behavior reduction in hard braking or hard turning with the user vehicle 212. As movement in the physical world occurs, such as the modified driving behavior, the movement itself creates additional information, such as additional instances of the location information 216 and the acceleration information 504, that is converted back to generate additional instances of the motion classification 226, for continued operation of the navigation system 100 and to continue in movement in the physical world.

Figure 6:
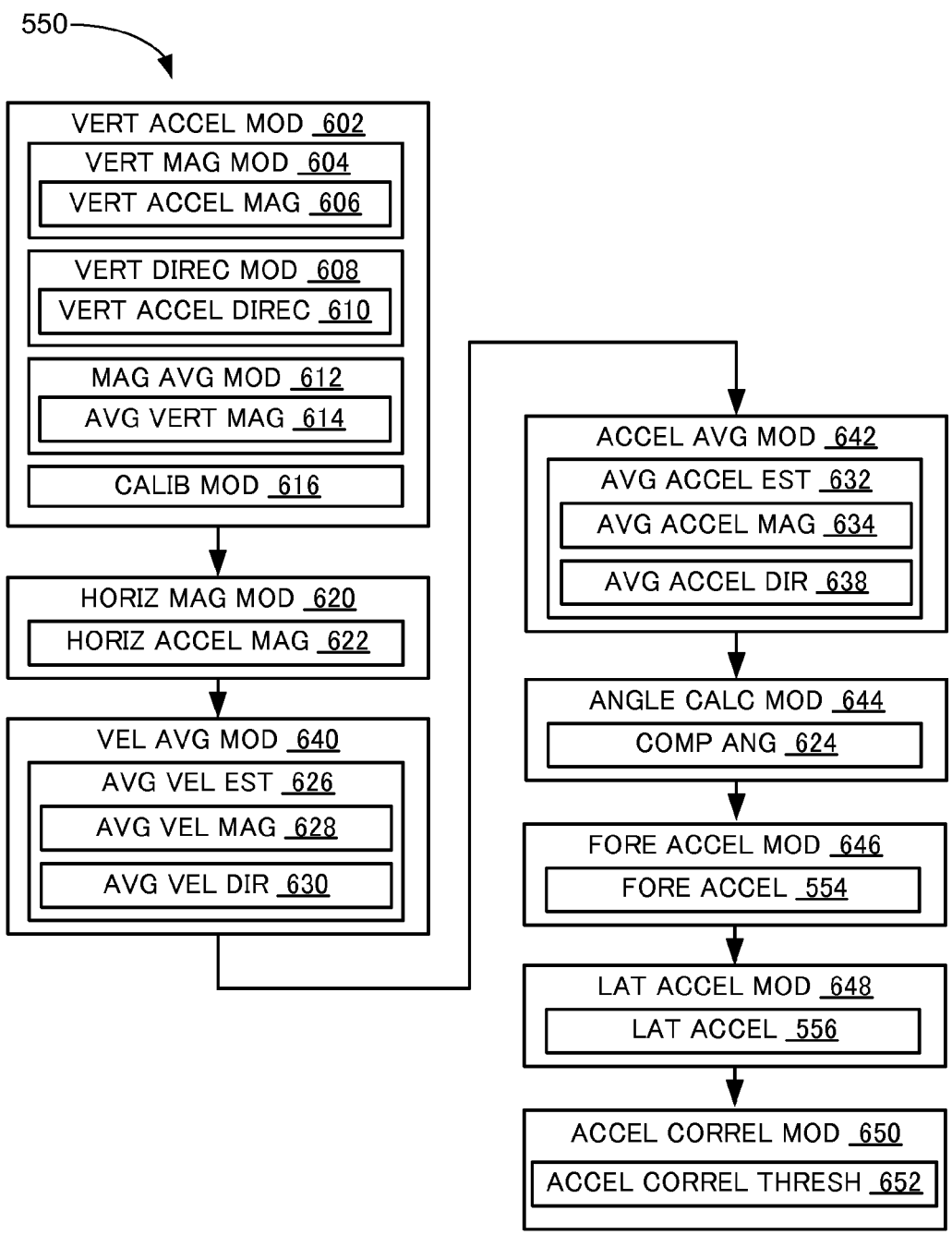
FIG. 6 is a view of the orientation module.

Referring now to FIG. 6, therein is shown a view of the orientation module 550. The orientation module 550 can determine the vertical acceleration 552 of FIG. 5 with a vertical acceleration module 602. The vertical acceleration module 602 is for determining the direction and magnitude of the vertical component of acceleration. The vertical acceleration module 602 can be coupled to the orientation module 550.

The vertical acceleration 552, which is a vector, can include a vertical acceleration magnitude 606 and a vertical acceleration direction 610. The vertical acceleration module 602 can include a vertical magnitude module 604 and a vertical direction module 608 for calculating the vertical acceleration magnitude 606 and the vertical acceleration direction 610, respectively.

The vertical magnitude module 604, coupled to the vertical acceleration module 602, is for determining the magnitude of the vertical component of the acceleration vector. The vertical acceleration module 602 can determine the vertical acceleration magnitude 606 based on the total acceleration magnitude 536 of FIG. 5 and the location information 216 in the location log 522 of FIG. 5.

For example, the vertical magnitude module 604 can check for changes in the travel velocity 512 of FIG. 3 between consecutive entries of the location information 216 of FIG. 2 in the location log 522. To continue the example, when the vertical acceleration module 602 does not detect any change in the travel velocity 512, the vertical magnitude module 604 can determine the vertical acceleration 552 as the acceleration measurement 310 for the corresponding entries of the acceleration log 518 of FIG. 5. More specifically, the vertical magnitude module 604 can determine the vertical acceleration magnitude 606 of the vertical acceleration 552 as the total acceleration magnitude 536. As a specific example, the vertical acceleration module 602 does not detect any change in the travel velocity 512 when the user vehicle 212 of FIG. 3 is stopped or traveling at a constant speed without changes in the travel heading 222.

The vertical direction module 608, coupled to the vertical acceleration module 602, is for determining the direction of the vertical component of the acceleration vector. The vertical direction module 608 can determine the vertical acceleration direction 610 based on the location information 216 in the location log 522. For example, in the situation where little or no change in the travel velocity 512 is detected, the vertical direction module 608 can determine that the acceleration measurement 310 is primarily due to the acceleration of gravity and can determine the vertical acceleration direction 610 as the direction of gravity. As a specific example, little or no change in the travel velocity 512 can be determined when the travel velocity 512 is calculated or measured as a constant value.

The vertical acceleration module 602 can include a magnitude average module 612, coupled to the vertical magnitude module 604. The magnitude average module 612 is for improving the accuracy of the acceleration magnitude. The magnitude average module 612 can improve the accuracy of the vertical acceleration 552 based on an average of specific entries of the acceleration log 518.

For example, the magnitude average module 612 can calculate an average vertical magnitude 614 as the average value of the vertical acceleration magnitude 606 for the entries in the acceleration log 518 corresponding to the entries in the location log 522 having little or no change in the travel velocity 512. As a specific example, little or no change in the travel velocity 512 can be determined when the travel velocity 512 is calculated or measured as a constant value.

As a further example, the magnitude average module 612 can calculate the average vertical magnitude 614 based on all the entries in the acceleration log 518 or a subset of the entries in the acceleration log 518. In yet a further example, the average vertical magnitude 614 can be used as the vertical acceleration magnitude 606 in any of the ensuing calculations.

The vertical acceleration module 602 can include a calibration module 616, coupled to the vertical magnitude module 604. The calibration module 616 is for calibration of acceleration measurements. The calibration module 616 can calibrate the acceleration measurement 310 based on comparison to the acceleration due to gravity.

For example, in the situation where little or no change in the travel velocity 512 is detected, the vertical acceleration 552 is primarily due to the acceleration of gravity. As a specific example, little or no change in the travel velocity 512 can be determined when the travel velocity 512 is calculated or measured as a constant value.

As a further example, any significant offset or difference between the magnitude of gravity and the vertical acceleration magnitude 606 can be attributed to the inaccuracies or mis-calibration in the measurement instrument, such as the accelerometer unit 460 of FIG. 4. The calibration module 616 can be used to determine the offset or difference between the magnitude of gravity and the vertical acceleration magnitude 606 to calibrate the acceleration measurement 310 by, for example, increasing or decreasing the value of the vertical acceleration magnitude 606.

The orientation module 550 can determine a horizontal acceleration magnitude 622 based on the vertical acceleration magnitude 606 with a horizontal magnitude module 620. The horizontal magnitude module 620 is for determining the portion of the acceleration magnitude due to acceleration in a two dimensional horizontal plane. The horizontal magnitude module 620 can be coupled to the vertical acceleration module 602.

The horizontal magnitude module 620 can calculate the horizontal acceleration magnitude 622 of the total acceleration magnitude 536 with the vertical acceleration magnitude 606. The horizontal acceleration magnitude 622 is defined as the horizontal component of the total acceleration magnitude 536. For example, the horizontal acceleration magnitude 622 can represent acceleration in a two dimensional horizontal plane that is normal to the direction of gravity or parallel to the surface of the earth. The curvature of the surface of the earth can be considered negligible relative to the horizontal plane.

As an example, the horizontal magnitude module 620 can calculate the horizontal acceleration magnitude 622 based on the difference between the total acceleration magnitude 536 and the vertical acceleration magnitude 606. As a specific example, the horizontal magnitude module 620 can calculate the horizontal acceleration magnitude 622 based on equation 2 as follows:

$$m_t^2 = m_{ag}^2 + m_{ah}^2 \qquad \text{(Equation 2)}$$

The total acceleration magnitude 536 can be represented by the variable "$m_t$". The vertical acceleration magnitude 606 can be represented by the variable "$m_{ag}$". The horizontal acceleration magnitude 622 can be represented by the variable "$m_{ah}$". Since the total acceleration magnitude 536 and the vertical acceleration magnitude 606 are known, the horizontal magnitude module 620 can solve for the horizontal acceleration magnitude 622.

The orientation module 550 can calculate the forward acceleration 554 of FIG. 5 and the lateral acceleration 556 of FIG. 5 based on the horizontal acceleration magnitude 622 and a component angle 624. The component angle 624 is defined as the angle between an estimated acceleration vector and an estimated velocity vector. As an example, the component angle 624 can be the angle between an average acceleration estimation 632 and an average velocity estimation 626.

The average velocity estimation 626 is defined as the velocity average calculated based on the velocities at two locations. For example, the average velocity estimation 626 can be calculated based on the difference between the travel velocity 512 of one of the location information 216 and the travel velocity 512 of a consecutive one of the location information 216 in the location log 522. The average velocity estimation 626 can be a vector having an average velocity magnitude 628 and an average velocity direction 630. As an example, the average velocity estimation 626 can be primarily along the two dimensional horizontal plane which can be parallel to the surface of the earth or normal to the direction of gravity.

The average acceleration estimation 632 is defined as the acceleration calculated based on the information related to the change in velocity and time between two locations. For example, the average acceleration estimation 632 can be based on the change in the travel velocity 512 and the location timestamp 218 of one of the location information 216 and the travel velocity 512 and the location timestamp 218 of a consecutive one of the location information 216 in the location log 522. The average acceleration estimation 632 can be a vector having an average acceleration magnitude 634 and an average acceleration direction 638. As an example, the average acceleration estimation 632 can be primarily along the two dimensional horizontal plane which can be parallel to the surface of the earth or normal to the direction of gravity.

The orientation module 550 can calculate the average velocity estimation 626 with a velocity average module 640. The velocity average module 640 can be coupled to the orientation module 550. The velocity average module 640 is for calculating average velocity based on the velocity at two locations. As an example, the velocity average module 640 can calculate the average velocity estimation 626 according to equation 3 as follows:

$$v_a = (v_1 + v_2)/2 \qquad \text{(Equation 3)}$$

The average velocity estimation 626 can be represented by the variable "$v_a$". The travel velocity 512 for one of the location information 216 can be represented by the variable "$v_1$" and the travel velocity 512 for a consecutive one of the location information can be represented by the variable $v_2$".

The orientation module 550 can calculate the average acceleration estimation 632 with an acceleration average module 642. The acceleration average module 642 is for calculating an average acceleration based on the change in velocity and time between two locations. The acceleration average module 642 can be coupled to the velocity average module 640.

The acceleration average module 642 can calculate the average acceleration estimation 632 based on the change in the travel velocity 512 and the location timestamp 218 of FIG. 2 of one of the location information 216 and the travel velocity 512 and the location timestamp 218 of a consecutive one of the location information 216 in the location log 522. As an example, the acceleration average module 642 can calculate the average acceleration estimation 632 based on equation 4 as follows:

$$a_e = (1/\Delta t)(v_2 - v_1) \qquad \text{(Equation 4)}$$

The average acceleration estimation 632 can be represented by the variable "$a_e$". The difference in the location timestamp 218 of one the location information 216 and a consecutive one of the location information 216 in the location log 522 can be represented by "$\Delta t$". The travel velocity 512 for one of the location information 216 can be represented by the variable "$v_1$" and the travel velocity 512 for a consecutive one of the location information can be represented by the variable "$v_2$".

The orientation module 550 can calculate the component angle 624 with an angle calculation module 644 coupled to the acceleration average module 642. The angle calculation module 644 is for calculating the angle between an acceleration vector and a velocity vector. The angle calculation module 644 can calculate the component angle 624 as the angle between the average velocity estimation 626 and the average acceleration estimation 632. For example, the angle calculation module 644 can calculate the component angle 624 as the angle between the average velocity direction 630 of the average velocity estimation 626 and the average acceleration direction 638 of the average acceleration estimation 632.

As a further example, the angle calculation module 644 can calculate the component angle 624 based on the average acceleration magnitude 634 and the average velocity magnitude 728. As a specific example, the component angle 624 can be calculated according to equation 5 as follows:

$$v_a \cdot a_e = |v_a||a_e|\cos\theta \qquad \text{(Equation 5)}$$

The symbol "•" can represent mathematical operation of the inner product between the average velocity estimation 626 "$v_a$" and the average acceleration estimation "$a_e$" 632. The average velocity magnitude 628 and the average acceleration magnitude 634 can be represented as "$|v_a|$" and "$|a_e|$", respectively.

In yet a further specific example, the component angle 624 can be calculated according to equation 6 as follows:

$$v_a \times a_e = |v_a||a_e|n\sin\theta \qquad \text{(Equation 6)}$$

The symbol "∞" can represent mathematical operation of the vector product between the average velocity estimation 626 "$v_a$" and the average acceleration estimation "$a_e$" 632. The average velocity magnitude 628 and the average acceleration magnitude 634 can be represented as "$|v_a|$" and "$|a_e|$", respectively. The variable "n" can represent a unit vector that is perpendicular to both the average velocity estimation 626 and the average acceleration estimation 632.

The orientation module 550 can calculate the forward acceleration 554 and the lateral acceleration 556 based on the horizontal acceleration magnitude 622 and the component angle 624 with a forward acceleration module 646 and a lateral acceleration module 648, respectively.

The forward acceleration module 646 is for calculating the component of an acceleration magnitude that is parallel with the heading of travel. For example, the forward acceleration module 646 can calculate the forward acceleration 554, which can be parallel to the travel heading 222. The forward acceleration module 646 can be coupled to the angle calculation module 644.

As an example, the forward acceleration module 646 can calculate the forward acceleration 554 according to equation 5 as follows:

$$a_f = m_h * \cos \theta \quad \text{(Equation 7)}$$

The forward acceleration 554 can be represented by the variable "$a_f$". The horizontal acceleration magnitude 622 can be represented by the variable "$m_h$". The component angle 624 can be represented by the variable theta "θ".

The lateral acceleration module 648 is for calculating the component of an acceleration magnitude that is perpendicular along the horizontal plane with the heading of travel. The lateral acceleration module 648 can be coupled to the angle calculation module 644. For example, the lateral acceleration module 648 can calculate the lateral acceleration 556 according to equation 5 as follows:

$$a_l = m_h * \sin \theta \quad \text{(Equation 8)}$$

The lateral acceleration 556 can be represented by the variable "$a_l$". The horizontal acceleration magnitude 622 can be represented by the variable "$m_h$". The component angle 624 can be represented by the variable theta "θ".

The orientation module 550 can include an acceleration correlation module 650, coupled to the acceleration average module 642. The acceleration correlation module 650 is for determining the degree of correlation between a measured value of acceleration and an estimated value of acceleration. The acceleration correlation module 650 can determine the degree of correlation between the horizontal acceleration magnitude 622 and the average acceleration magnitude 634 with an acceleration correlation threshold 652.

The acceleration correlation threshold 652 can be based on a multiple or fractional value of the horizontal acceleration magnitude 622 or the average acceleration magnitude 634. As a specific example, the acceleration correlation threshold 652 can be double the value of the horizontal acceleration magnitude 622 or the average acceleration magnitude 634, although it is understood that the acceleration correlation threshold 652 can be a different multiple or fractional value.

The acceleration correlation module 650 can determine the degree of correlation between the horizontal acceleration magnitude 622 and the average acceleration magnitude 634 by comparing the difference of the horizontal acceleration magnitude 622 and the average acceleration magnitude 634 with the acceleration correlation threshold 652. For example, if the difference between the horizontal acceleration magnitude 622 and the average acceleration magnitude 634 is less than the acceleration correlation threshold 652, the orientation module 550 can determine that good correlation exists between the horizontal acceleration magnitude 622 and the average acceleration magnitude 634.

However, for example, if the horizontal acceleration magnitude 622 and the average acceleration magnitude 634 is greater than the acceleration correlation threshold 652, then the acceleration correlation module 650 can determine that there is poor agreement between the horizontal acceleration magnitude 622 and the average acceleration estimation 632. Poor agreement can mean that the horizontal acceleration magnitude 622, the average acceleration estimation 632, or a combination thereof is inaccurate or unreliable. If there is poor agreement, then the orientation module 550 can disregard the forward acceleration 554, the lateral acceleration 556, or a combination thereof.

It has been discovered that the navigation system 100 provides accurate determination of the forward acceleration 554 and the lateral acceleration 556 with the acceleration correlation module 650 based on comparison of the horizontal acceleration magnitude 622 and the average acceleration magnitude 634 with the acceleration correlation threshold 652.

Figure 7:
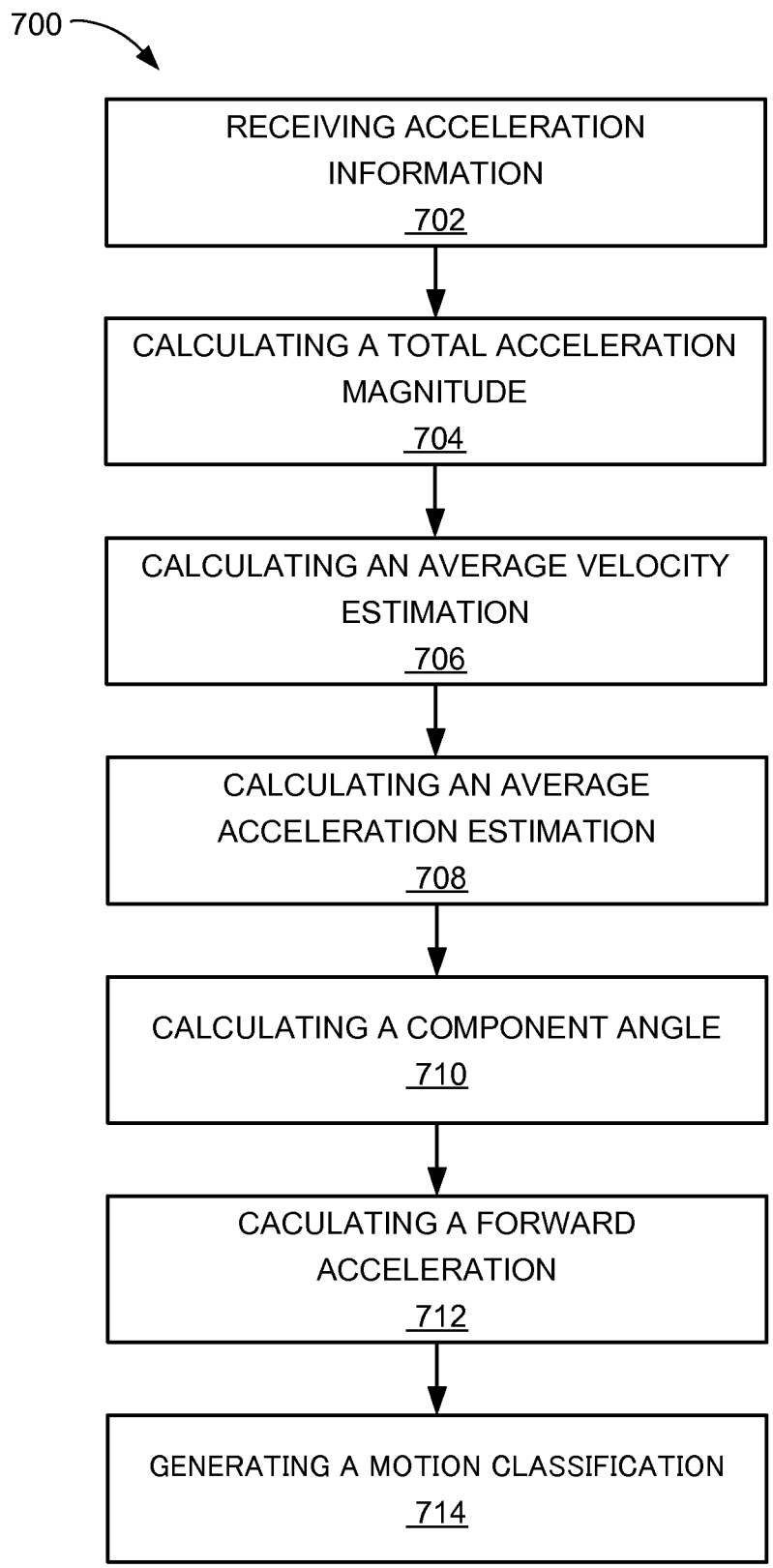
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: receiving acceleration information, including an acceleration measurement, and location information in a block 702; calculating a total acceleration magnitude, having a vertical acceleration magnitude and a horizontal acceleration magnitude, from the acceleration measurement in a block 704; calculating an average velocity estimation from the location information in a block 706; calculating an average acceleration estimation from the location information in a block 708; calculating a component angle between the average velocity estimation and the average acceleration estimation in a block 710; calculating a forward acceleration and a lateral acceleration with the component angle and the horizontal acceleration magnitude in a block 712; and generating a motion classification for a travel acceleration based on the forward acceleration and the lateral acceleration for displaying on a device in a block 714.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:
1. A method of operation of a navigation system comprising:

receiving acceleration information, including an acceleration measurement, and location information, the acceleration information for measuring an acceleration of a device in a vehicle;

calculating a total acceleration magnitude, having a vertical acceleration magnitude and a horizontal acceleration magnitude, from the acceleration measurement for removing a dependence of the acceleration measurement on an orientation of the device;

calculating an average velocity estimation from the location information;

calculating an average acceleration estimation from the location information;

calculating a component angle between the average velocity estimation and the average acceleration estimation;

calculating a forward acceleration and a lateral acceleration with the component angle and the horizontal acceleration magnitude; and generating a motion classification, with a control unit, for representing a travel acceleration of the vehicle with the device therein based on the forward acceleration and the lateral acceleration for displaying on the device.

2. The method as claimed in claim 1 wherein calculating the total acceleration magnitude includes calculating the total acceleration magnitude based on an x-component magnitude, a y-component magnitude, and a z-component magnitude of the acceleration measurement.

3. The method as claimed in claim 1 further comprising determining the travel acceleration by removing an incidental acceleration from the acceleration measurement based on an acceleration duration threshold.

4. The method as claimed in claim 1 further comprising determining the travel acceleration by removing an incidental acceleration from the acceleration measurement based on an acceleration size threshold.

5. The method as claimed in claim 1 further comprising correlating an average acceleration magnitude of the average acceleration estimation and the horizontal acceleration magnitude based comparing a difference between the average acceleration magnitude and the horizontal acceleration magnitude to an acceleration correlation threshold.

6. A method of operation of a navigation system comprising:

receiving acceleration information, including an acceleration measurement, and location information, the acceleration information for measuring an acceleration of a device in a vehicle;

generating an acceleration log with the acceleration information and a location log with the location information;

calculating a total acceleration magnitude, having a vertical acceleration magnitude and a horizontal acceleration magnitude, from the acceleration measurement for removing a dependence of the acceleration measurement on an orientation of the device;

calculating an average velocity estimation from the location information;

calculating an average acceleration estimation from the location information;

calculating a component angle between the average velocity estimation and the average acceleration estimation;

calculating a forward acceleration and a lateral acceleration with the component angle and the horizontal acceleration magnitude; and generating a motion classification, with a control unit, for representing the travel acceleration of the vehicle with the device therein based on the forward acceleration and the lateral acceleration for displaying on the device.

7. The method as claimed in claim 6 further comprising calculating the horizontal acceleration magnitude as a difference between the vertical acceleration magnitude and the total acceleration magnitude.

8. The method as claimed in claim 6 wherein calculating the component angle includes calculating the component angle as an angle between an average velocity direction of the average velocity estimation and an average acceleration direction of the average acceleration estimation.

9. The method as claimed in claim 6 further comprising calculating the average acceleration estimation based on the average velocity estimation for consecutive entries of the location information in the location log.

10. The method as claimed in claim 6 further comprising calculating the average velocity estimation based on consecutive entries of the location information in the location log.

11. A navigation system comprising:

an accelerometer unit configured to send acceleration information, including an acceleration measurement, and location information, the acceleration information for measuring an acceleration of a device in a vehicle; and a control unit, coupled to the accelerometer unit, configured to:

calculate a total acceleration magnitude, having a vertical acceleration magnitude and a horizontal acceleration magnitude, from the acceleration measurement for removing a dependence of the acceleration measurement on an orientation of the device;

calculate an average velocity estimation from the location information;

calculate an average acceleration estimation from the location information;

calculate a component angle between the average velocity estimation and the average acceleration estimation;

calculate a forward acceleration with the component angle and the horizontal acceleration magnitude;

calculate a lateral acceleration with the component angle and the horizontal acceleration magnitude; and generate a motion classification for representing a travel acceleration of the vehicle with the device therein based on the forward acceleration and the lateral acceleration for displaying on the device.

12. The system as claimed in claim 11 wherein the control unit is configured to calculate the total acceleration magnitude based on an x-component magnitude, a y-component magnitude, and a z-component magnitude of the acceleration measurement.

13. The system as claimed in claim 11 wherein the control unit is configured to determine the travel acceleration by removing an incidental acceleration from the acceleration measurement based on an acceleration size threshold.

14. The system as claimed in claim 11 wherein the control unit is configured to determine the travel acceleration by removing an incidental acceleration from the acceleration measurement based on an acceleration duration threshold.

15. The system as claimed in claim 11 wherein the control unit is configured to correlate an average acceleration magnitude of the average acceleration estimation and the horizontal acceleration magnitude based comparing a difference between the average acceleration magnitude and the horizontal acceleration magnitude to an acceleration correlation threshold.

16. The system as claimed in claim 11 wherein the control unit is configured to generate:

an acceleration log with the acceleration information; and a location log with the location information with the acceleration information.

17. The system as claimed in claim 16 wherein the control unit is configured to calculate the horizontal acceleration magnitude as a difference between the vertical acceleration magnitude and the total acceleration magnitude.

18. The system as claimed in claim 16 wherein the control unit is configured to calculate the component angle as an angle between an average velocity direction of the average velocity estimation and an average acceleration direction of the average acceleration estimation.

19. The system as claimed in claim 16 wherein the control unit is configured to calculate the average acceleration estimation based on the average velocity estimation for consecutive entries of the location information in the location log.

20. The system as claimed in claim 16 wherein the control unit is configured to calculate the average velocity estimation based on consecutive entries of the location information in the location log.

\* \* \* \* \*